Figure 1:
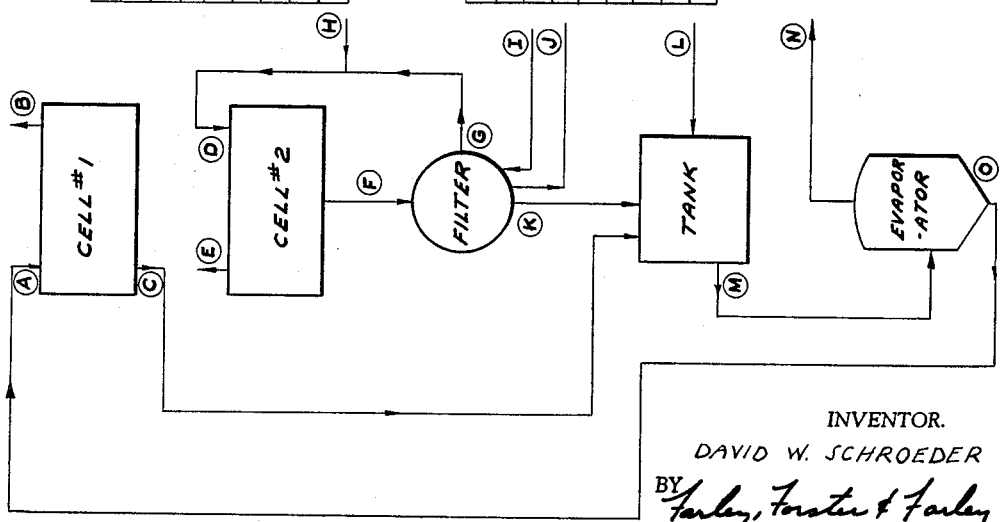

MATERIAL BALANCE Lbs/HR

| STREAM | A | B | C | D | E | F | G | H |
|---|---|---|---|---|---|---|---|---|
| NiCl₂ | 235 | - | 113 | - | - | - | - | - |
| Ni(OH)₂ | - | - | - | - | - | 87 | - | 60 |
| NaCl | 400 | - | - | 500 | - | 500 | 440 | - |
| H₂O | - | - | 400 | 2500 | - | 2466 | 2166 | 334 |
| HCl | - | - | - | - | - | - | - | - |
| Cl₂ | - | 67 | - | - | - | - | - | - |
| H₂ | - | - | - | - | 1.9 | - | - | - |
| TOTAL | 635 | 67 | 513 | 3000 | 1.9 | 3053 | 2606 | 394 |

| STREAM | I | J | K | L | M | N | O** |
|---|---|---|---|---|---|---|---|
| NiCl₂ | - | - | - | - | 235 | - | 235 |
| Ni(OH)₂ | - | - | 87 | - | - | - | - |
| NaCl | - | 60 | - | 119 | 853 | 453 | 400 |
| H₂O | x | x | 300 | 68.5 | - | - | - |
| HCl | - | - | - | - | - | - | - |
| H₂ | - | - | - | - | - | - | - |
| Cl₂ | - | - | - | - | - | - | - |
| TOTAL | x | x | 387 | 187.5 | 1088 | 453 | 635 |

*STREAM I FURNISHED SUFFICIENT WATER TO WASH THE PRECIPITATE FREE OF SALT. IT IS ASSUMED THAT ALL THIS WATER LEAVES THE FILTER IN STREAM J.

**IDENTICAL WITH STREAM A

INVENTOR.
DAVID W. SCHROEDER
BY
ATTORNEYS

Jan. 28, 1964 D. W. SCHROEDER 3,119,757
PROCESS AND APPARATUS FOR THE CONVERSION
OF HYDROCHLORIC ACID TO CHLORINE
Filed June 13, 1960 3 Sheets-Sheet 3
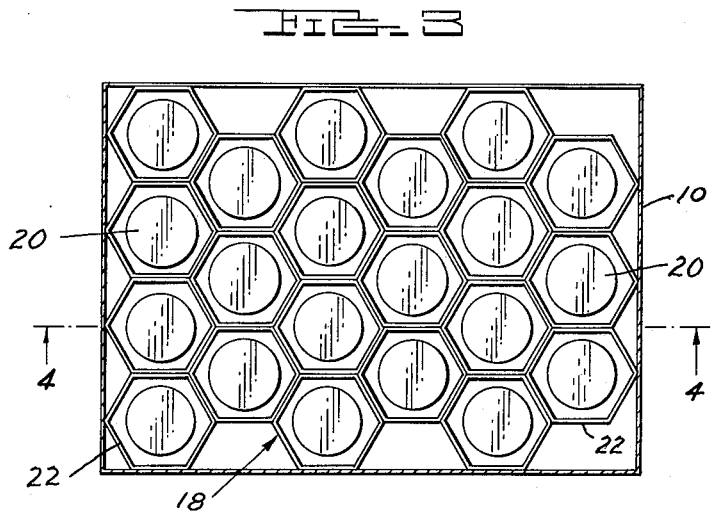
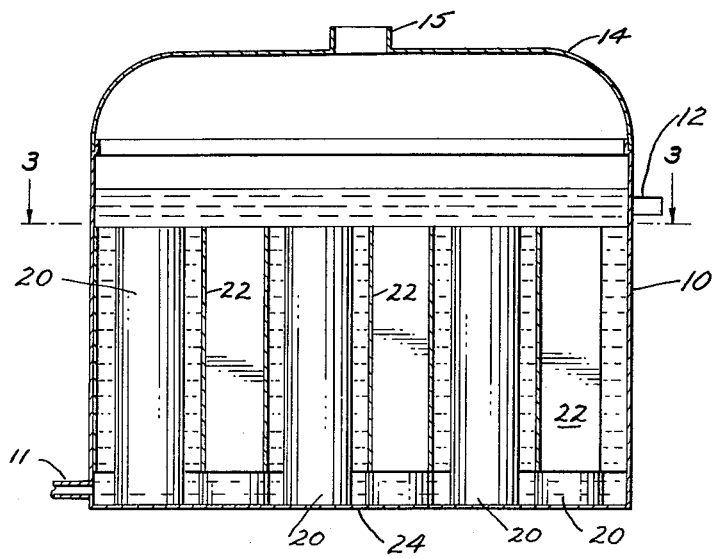
INVENTOR.
DAVID W. SCHROEDER
BY
Farley, Forster & Farley
ATTORNEYS

United States Patent Office 3,119,757
Patented Jan. 28, 1964

3,119,757
PROCESS AND APPARATUS FOR THE CONVERSION OF HYDROCHLORIC ACID TO CHLORINE
David W. Schroeder, 1824 Federal, Seattle, Wash., assignor of eight percent to Loda W. Rogers and Edith K. Rogers, Pontiac, Mich., and two percent to Paul O. Johnson and Dora C. Johnson, Lafayette, Ind.
Filed June 13, 1960, Ser. No. 35,837
11 Claims. (Cl. 204—128)

This invention relates to a cyclic process for converting hydrochloric acid to chlorine and to improvements in apparatus for practicing the process. The present application is a continuation-in-part of my co-pending application Serial No. 754,345 filed August 11, 1958, now abandoned.

Hydrochloric acid is produced as a by-product of many industrial chemical reactions. For example, in the chlorination of paraffin hydrocarbons about half the chlorine used is converted to hydrogen chloride which upon absorption in water forms hydrochloric acid. Since the acid produced is not always in demand while chlorine is in demand, a means of converting the hydrochloric acid back into chlorine is desirable.

The classic process for converting hydrochloric acid to chlorine is one in which hydrogen chloride is mixed with air or oxygen and passed over a catalyst. A partial conversion of hydrogen chloride to chlorine and water is achieved. The process suffers from serious corrosion problems. Furthermore, the chlorine produced is diluted with air or oxygen and unreacted hydrogen chloride, and the removal of these impurities is a large problem.

Other methods that have been proposed include the direct electrolysis of hydrochloric acid. The success of this method depends upon an efficient reliable diaphragm to separate the chlorine and hydrogen produced. An explosive condition results if these gases mix.

Another method is disclosed in U.S. Patent 2,468,766 and is based on the electrolysis of cupric chloride to form cuprous chloride and evolve chlorine. The cuprous chloride is then reacted with hydrochloric acid and oxygen to reform the cupric chloride and water. The second step in this process is difficult because the oxidation of cupric chloride in an acid solution is very slow. An additional difficulty is that the process produces water which is hard to remove. This difficulty is increased if hydrochloric acid is fed to the process in aqueous form.

The overall object of the present invention is to provide a process which overcomes problems and difficulties of the type present in previously known processes as outlined above. The process of the present invention is a cyclic type and involves two main steps. First, decomposing, as by electrolysis, a metal chloride into the chlorine desired from the process and the metal component of the chloride. Second, reforming the metal chloride for recycling the process from the metal component produced in step 1 and hydrochloric acid, so that the overall result is a conversion of the acid into chlorine.

These first and second main steps of the present process are illustrated by the following reactions:

$$MCl_2 \xrightarrow{elec.} M + Cl_2 \quad (1)$$

$$M + 2HCl \longrightarrow MCl_2 + H_2 \quad (2)$$

Two sets of cells are employed to carry out the above reactions. In one cell reaction No. 1 takes place electrolytically depositing the metal at the cathode and producing chlorine at the anode. In the other cell which does not necessarily require current, the metal is dissolved with hydrochloric acid according to reaction No. 2 and the metal chloride produced is fed to the first cell. The net result of the two reactions is the production of chlorine and hydrogen from hydrochloric acid. After the reactions have proceeded for a suitable period there will be a heavy deposit of metal on the cathodes of the first cell while the second cell would be depleted of metal. The roles of the cells are then reversed.

The metals that could possibly be used to carry out these reactions have to lie between zinc and hydrogen in the electromotive force series. Metals above zinc cannot easily be obtained by the electrolysis of aqueous solutions of their salts. Metals below hydrogen will not react according to Equation No. 2 above. Of the possible metals in this group I have found that nickel is the most promising.

The process of the present invention will be described with nickel being used as the metal and reasons for preferring nickel over other possible metals will be outlined hereinafter.

Reforming of the metal chloride from the metal component and hydrochloric acid can be carried out in a number of different ways which in general comprise (a) employing the metal component deposited in reaction No. 1 as the anode in the second electrolytic process in which a solution of hydrochloric acid forms the electrolyte. When current is applied the metal chloride is reformed according to the following reaction:

$$Ni + 2HCl \rightarrow NiCl_2 + H_2 \quad (3)$$

(b) employing the metal component deposited in the first step as the anode in an electrolytic process using a non-acid electrolyte to form the hydroxide of the metal component. The hydroxide forms as a non-soluble precipitate which can readily be filtered out of the electrolyte according to reaction 4.

$$Ni + 2H_2O \rightarrow Ni(OH)_2 + H_2 \quad (4)$$

By dissolving the metal hydroxide in hydrochloric acid, the chloride is reformed, and the resulting chloride solution can readily be brought to the desired concentration for re-use as the electrolyte in step one.

$$Ni(OH)_2 + 2HCl \rightarrow NiCl_2 + 2H_2O \quad (5)$$

(c) dissolving nickel in a solution of hydrochloric acid to carry out the following reaction without the use of current.

$$Ni + 2HCl \rightarrow NiCl_2 + H_2 \quad (6)$$

This reaction which ordinarily proceeds so slowly as to have little commercial possibility has been made practical by my discovery that the rate of nickel corrosion is materially increased by the presence of nickel chloride in the hydrochloric acid solution, at least to an extent which makes practical commercial application of the reaction possible when employed in an improved design of cell which exposes a very large area of metal for a given size of cell. This same improved design of cell is equally useable in commercially carrying on reaction No. 1 of the process.

Figure 2:
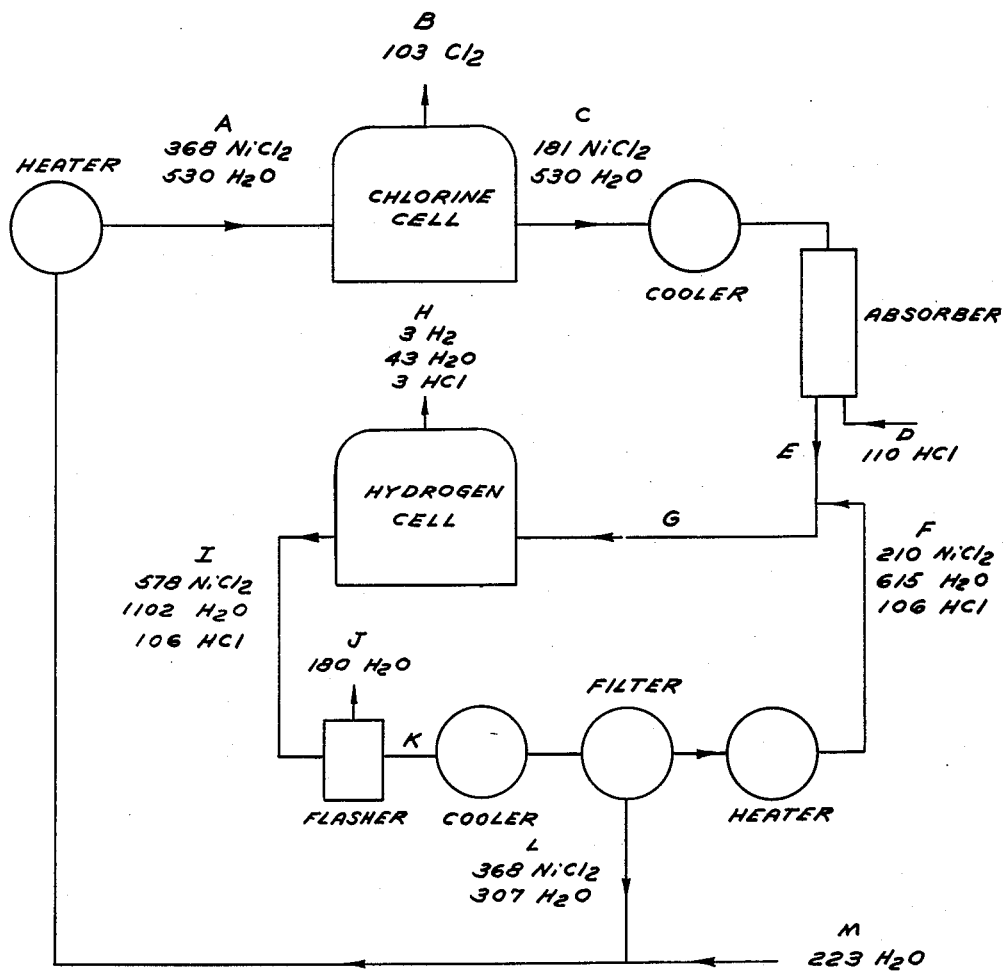

Representative flow diagrams for commercial application of the process are given in the accompanying drawings together with details of the improved cell construction. These drawings comprise the following views:

FIGURE 1, a flow diagram illustrating the process as practiced using the combination of Equations 1, 3 and 4 above;

FIGURE 2, a flow diagram illustrating the process as practiced under the combination of reactions 1 and 6 above;

FIGURE 3, a sectional plan view of the cell construction of the invention taken on the line 3—3 of FIGURE 4; and FIGURE 4, a sectional elevation taken on the line 4—4 FIGURE 3.

The steps of the process and reactions involved therein will be described separately, followed by descriptions of representative examples for practicing the process commercially.

STEP 1.—ELECTROLYSIS OF NICKEL CHLORIDE $$NiCl_2 \xrightarrow{elec.} Ni+Cl_2$$

In this step the anode must be an inert material. Carbon is satisfactory. The cathode can be any conducting material having satisfactory corrosion resistance. It will, in any case, become coated with metal. Materials used satisfactorily have been nickel, carbon and copper. Provided the nickel chloride content of the solution is above 10%, the temperature above 40° C. and the pH above 1.5 no hydrogen is formed. The cathode current efficiency is 99%, the anode efficiency 97 to 98%. No diaphragm is needed and cell construction is simple.

As a result of several experiments it was found that when the carbon anode and nickel cathode are separated by ¼ inch and the solution is about 22% NiCl₂ at 90° C. the voltage required for a desired current density is given by the expression $$E = 1.85 + 0.00175\ CD$$

where $E$ = voltage required, volts and $CD$ = current density, amps./ft.²

STEP 2.—REFORMING THE METAL CHLORIDE

(A) By Electrolytic Process:

$$Ni + 2HCl \xrightarrow{elec.} NiCl_2 + H_2 \quad (3)$$

When using direct current a nickel anode is used. A carbon or nickel cathode is satisfactory. A voltage above 0.1 volt is required. The exact voltage required depends upon the concentration of electrolyte, the temperatures, the current density required and the arrangement of the cell.

For example, when a nickel covered carbon anode and a carbon cathode each 5/16 inch in diameter and ¾ inch (center to center) apart were immersed in 12 normal hydrochloric acid to a depth of 2 inches, a current 0.5 amp. flowed with 1.0 volt drop over the cell. The same set of electrodes when immersed in 100 ml. of 0.384 normal hydrochloric acid required 4.2 volts drop to produce a flow of 1.7 amperes. When the last run had gone on for 40 minutes it was found that 1.3 gms. of nickel had dissolved from the anode (theoretical for ampere hours: 1.24 gms.) but 0.2 gm. of nickel had deposited on the cathode so that the net nickel dissolved was 89% of theoretical. After the run 1.8 ml. of 1.20 normal potassium hydroxide was required to neutralize the excess hydrochloric acid in the electrolyte. Hence 86% of the theoretical amount of hydrochloric acid for the amperage passed had been consumed.

It is of course possible to use an acidified solution of nickel chloride as electrolyte. For example, the electrodes described above were immersed in a mixture of 100 ml. of 40% NiCl₂·6H₂O plus 10 ml. of 12 normal hydrochloric acid. At 1.70 volts a current of 2.0 amps. flowed. After 1 hour and 48 minutes at these conditions the theoretical amount of nickel dissolved should be 3.92 gms. Actually 4.22 gms. nickel were dissolved from the anode but 1.15 gms. of nickel were deposited on the cathode. The net nickel dissolved is thus 3.07 gms. (79% of theoretical).

When using an alternating current both electrodes should be nickel. Two nickel covered carbon electrodes were immersed in 1.53 normal hydrochloric acid. At 1.32 volts drop 1.65 amperes of 60 cycle alternating current flowed for 15 minutes. Hydrogen was evolved from both electrodes. At the end of the run 0.294 gm. of nickel had dissolved (65% of theoretical for the amperage which had flowed).

This manner of performing step two of the process is, at present, the least preferred due to the low current efficiency and substantial voltages required as indicated by the foregoing laboratory experiments.

(B) By Forming Nickel Hydroxide as an Intermediate Step:

$$Ni + 2H_2 \xrightarrow{elec.} Ni(OH)_2 + H_2 \quad (4)$$

$$Ni(OH)_2 + 2HCl \longrightarrow NiCl_2 + 2H_2O \quad (5)$$

Using a nickel anode, a cathode of carbon, copper, nickel or iron, and a solution of sodium or potassium chloride as the electrolyte, reaction 4 takes place upon passing a direct current. A series of experiments showed that when reaction 4 is carried out in a 16% sodium chloride solution (the concentration for maximum electrical conductivity) the current efficiency is 100%; and that with a nickel anode and a carbon cathode immersed in such solution at 90° C. and separated by ¼ inch, the voltage required for a desired current density is given by the expression $$E = 1.09 + 0.00375\ CD$$

where $E$ = voltage required, volts $CD$ = current density, amps./square foot

The nickel hydroxide formed in neutral solution is easily dissolved in hydrochloric acid to produce nickel chloride.

This combination of reactions 4 and 5 is a feasible way of performing the second step of the process and a representative commercial example based thereon will be hereinafter described.

(C) By Dissolving Nickel Non-Electrolytically in a Solution of Hydrochloric Acid $$Ni + 2HCl \rightarrow NiCl_2 + H_2 \quad (6)$$

Ordinarily, this would not be considered to be a practical way of performing the second step of the process. Nickel is generally recognized as having a relatively high resistance to corrosion, or in other words, the ordinary corrosion rate of nickel in hydrochloric acid is so low that too many cells would be required for an economical operation. Furthermore, the nickel chloride reformed could not be recycled to the chlorine producing cells of step one without causing other problems, unless substantially free of hydrochloric acid.

These difficulties, however, are overcome by the present invention, to an extent which makes reaction 6 the presently preferred way of performing the second step of the process, in the following manner:

(1) By the discovery that the presence of nickel chloride in a hydrochloric solution materially increases the rate of nickel corrosion. The table below gives a comparison of corrosion rates in the presence and absence of nickel chloride.

RATE OF SOLUTION OF NICKEL IN HYDROCHLORIC ACID AND NICKEL CHLORIDE SOLUTIONS

| Gms. HCl | Gms. H₂O | Gms. NiCl₂ | Temperature, F.° | Corrosion Rate, inches/day |
|---|---|---|---|---|
| 0.5 | 99.5 | 0.0 | Boiling | 0.00083 |
| 1.0 | 99.0 | 0.0 | Boiling | 0.00186 |
| 5.0 | 95.0 | 0.0 | Boiling | 0.0157 |
| 10.0 | 90.0 | 0.0 | 218 | 0.0163 |
| 10.0 | 90.0 | 67.0 | 220 | 0.034 |
| 1.0 | 99.0 | 83 | 238 | 0.0173 |

(2) By taking advantage of the fact that nickel chloride is much more soluble at high temperature than it is at low temperature in order to separate the solid nickel chloride formed in reaction 6 from the acid solution.

This solid nickel chloride separated from the acid solution can then be dissolved in water to form a solution sufficiently free of acid to be satisfactorily fed to the electrolytic cell where the nickel chloride is decomposed to nickel and chlorine according to the reaction 1 of the first step of the process.

(3) By employing an improved design of cell made possible, in part at least, because of the simplicity of reaction 1 of the process, can be employed for both steps thereof. Reaction 1 has several advantages. The two products do not readily react with one another or with the feed solution under the conditions in the cell hence there is no need to try to separate them; separate anode and cathode compartments are not needed. No diaphragm is needed. Only one gas is produced in the cell so no provisions need be made to separate two product gases. Hence it is possible to expose a very large electrode area in a cell requiring moderate floor area. The large electrode area permits a high rate of chlorine production per square foot of floor area even at low current densities.

An example of this improved cell construction is illustrated in FIGS. 3 and 4. The cell consists of suitable structure forming a tank 10 having liquid inlet and outlet passages 11 and 12, respectively. A cell cover 14 provided with a gas exit passage 15 encloses the upper portion of the cell. A multi-unit electrode construction is provided, consisting of a honeycomb or cellular cathode generally indicated 18, and anodes 20, each mounted within one division or cell of the cathode structure. In the construction shown, the cathode 18 is composed of a plurality of hexagonal tubes 22 of nickel or of a nickel coated material such as copper or Monel. The anodes 20 each consist of a rod placed within one of the tubes 22 and extending to the bottom 24 of the cell where they are suitably connected by means not shown to the electrical supply. Each anode rod 20 can be made of any insoluble conducting material inert to chlorine, but usually carbon or graphite would be employed.

The construction shown is an example of one way in which a very large electrode area can be obtained for moderate floor area. If the cathode assembly consisted of hexagonal sections measuring 1 inch on each side and the assembly were 2 feet high each square foot of floor area of the cell would contain 52 square feet of cathode area. Thus a cell 5 feet long and 5 feet wide would contain 1300 square feet of cathode area. If the anode rods inserted in each hexagon are 1¼ inch in diameter there will be 860 square feet of anode surface directly opposing the cathode surface in the 5' x 5' x 2' cell.

With such design it is possible to get 35,000 amps. into a cell measuring 5' x 5' x 5' while holding the current density as low as 27 amps. per square foot. This is a higher amperage (and hence gives a higher chlorine production per cell) than is common in chlorine cells of this size of any type.

REPRESENTATIVE COMMERCIAL PROCESSES (A) *Process Based on a Combination of Reactions 1, 4 and 5*

In the accompanying flow diagram and material balance table, FIGURE 1, a nickel chloride solution containing ca. 37% $NiCl_2$ (stream A) is fed to cell number 1. This cell contains nickel cathodes and carbon anodes. A practical design for such a cell would have nickel cathodes about 1/16 inch thick facing carbon anodes. Initially the distance between the nickel cathodes and carbon anodes would be about ½ inch. There would be about 210 square feet of cathode area and 210 square feet of anode area. A current of 23,000 amps. would flow through the cell under a voltage drop of about 2 volts. Nickel would be deposited on the cathodes at the rate of 55 lbs./hr. Chlorine would be evolved from the anode, bubble out of the liquid and be withdrawn from the cell at the rate of 67 lbs./hr. (stream B). The solution leaving the cell (stream C) contains about 22% $NiCl_2$ and is routed to a mixing tank.

Cell number 2 is very much like cell 1 except that the nickel is now the anode and carbon the cathode. The nickel anodes are about 9/16 inch thick and initially the distance between them and the cathodes is about ¼ inch. This cell is fed about 3000 lbs./hr., the exact amount is not critical, of a 16% sodium chloride solution (stream D). A current of 23,000 amperes is passed requiring a voltage of about 1.5 volts. Nickel is dissolved from the anode at the rate of 55 lbs./hr. Hydrogen is liberated at the cathode at the rate of 1.9 lbs./hr. and is removed from the cell (stream E). A precipitate of nickel hydroxide forms in the salt solution. This mixture of salt solution and nickel hydroxide (stream F) is pumped to a filter where the majority of the salt solution is filtered off and returned to number 2 cell (stream G).

The diagram shows a make-up stream H to replace the salt and water retained by the precipitated nickel hydroxide. The diagram also shows a stream of wash water (stream I) coming to the filter to wash out the salt retained on the precipitate. The amount of water and salt retained on the precipitate depend upon the design of the filter so that the figures given are for illustration only. As a matter of fact it is not even necessary to wash the precipitate. If the precipitate is not washed some salt (sodium chloride) will enter the $NiCl_2$ solution where it will build up a concentration until is precipitates in the evaporator. The presence of sodium chloride in the nickel chloride solution during the electrolysis of nickel chloride does no harm.

The precipitated nickel hydroxide (stream K) is fed to the mixing tank. The 22% nickel chloride solution (stream C) from cell number 1 and hydrochloric acid (stream L) are also fed to the tank. The hydrochloric acid dissolves the nickel hydroxide producing nickel chloride so that the solution leaving the mixing tank contains the amount of nickel chloride needed to feed cell number 1 but it also contains excess water due to the water retained by the precipitated nickel hydroxide and that brought in with the hydrochloric acid. This dilute $NiCl_2$ solution is fed to an evaporator where it is concentrated to 37% $NiCl_2$ and becomes stream A. The net result of the process is that hydrochloric acid is converted to chlorine and hydrogen.

This process goes on for 48 hours. At the end of this time 2700 lbs. of nickel have been deposited in cell number 1 and 2700 lbs. of nickel have been dissolved from cell 2. The cathodes in cell number 1 are now 9/16 of an inch thick and the distance between the nickel and carbon is now ¼ inch. The anodes in cell number 2 are now only 1/16 inch thick and the distance between the nickel and carbon is now ½ inch. At this point the roles of the cells are reversed. The nickel chloride solution is fed to cell number 2 and the sodium chloride solution is fed to cell number 1. The current is reversed also so that nickel is the cathode in cell 2 and carbon is the cathode in cell 1. The system is now ready for another 48 hour run.

(B) *Process Based on a Combination of Reactions 1 and 6*

The accompanying material balance and flow diagram FIG. 2 gives an example of this process for a plant producing about 2500 pounds of chlorine per day. It uses two cells of the type shown in FIGS. 3 and 4, each covering 25 square feet of floor area such as previously described. One cell will be producing chlorine, the other which will need no electricity, will produce hydrogen. After a suitable period (e.g. 48 hours) the roles of the two cells will be reversed.

A solution of nickel chloride in water (stream A) is fed to the chlorine producing cell. This cell will require a direct current voltage of 1.9 volts. A current of 35,000 amps. will flow. Chlorine will be produced and nickel will be deposited on the cathode. The partially depleted nickel chloride solution will be cooled and sent to an absorber where it will be contacted with gaseous hydrogen chloride. The amount of hydrogen chloride will be chemically equivalent to the chlorine produced. (In the event that aqueous HCl is to be fed to the system the stream C will go to an evaporator where water equivalent to that in the feed will be removed. The concentrated nickel chloride will be mixed with the aqueous HCl feed and become stream E. No absorber will be needed.) The solution leaving the absorber (stream E) is joined by a recycle acid-nickel chloride stream (stream F) and the combined stream goes to the hydrogen producing cell. This cell has previously been in chlorine producing service and has a layer of nickel built up on the metal electrode surfaces. The hydrochloric acid in the feed dissolves this nickel, producing nickel chloride in solution and hydrogen gas. No electricity need be used in this process. Some water and a little hydrogen chloride leave the hydrogen cell with the hydrogen. The liquid effluent from the hydrogen cell goes to a flash chamber. This chamber is at low pressure. (Two inches of mercury absolute pressure in the example given although other methods of operation are possible.) The effluent loses water by evaporation and cools. The remaining liquid is cooled further in a cooler so that it will deposit crystals of nickel chloride (usually in the form of the hydrate $NiCl.6H_2O$) equal to the amount of nickel chloride required for feed to the chlorine cell. This solid is filtered off. The remaining liquid is the recycle acid-nickel chloride solution (stream F). The solid is dissolved in water, heated and is ready to be fed to the chlorine producing cells.

Operation continues in this manner until the nickel built up in the chlorine cells is deemed too thick for further operation. (The rate of build up is about 0.035 inch/day). Whereupon the roles of the cells are reversed. The cell which has been producing chlorine (nickel depositing cell) and has a large deposit of nickel is now made the hydrogen producing (nickel dissolving) cell. The cell which has been producing hydrogen is now depleted of nickel and is made the chlorine producing cell. A cycle time of 48 hours is suitable.

USE OF METALS OTHER THAN NICKEL

The common metals lying between hydrogen and zinc in the electromotive force series are iron, lead, tin, nickel, cobalt, cadmium, chromium and zinc. Each will be briefly discussed.

*Iron.*—Ferric chloride can be decomposed by electricity into chlorine and iron. This process is easy and the electrical requirement is lower than that required for the electrolysis of nickel chloride. However when iron is dissolved in hydrochloric acid ferrous chloride is produced. If an attempt is made to decompose ferrous chloride electrically difficulties occur. If ferrous ions approach the anode they are converted to ferric ions. This reaction will compete with the production of chlorine. Hence it is necessary to have separate anode and cathode compartments and the liquid in the anode compartment must not be ferrous chloride. In addition the decomposition voltage of ferrous chloride is higher than that of nickel chloride. Iron is not an attractive alternate.

*Lead.*—The chloride is too sparingly soluble to be useful.

*Tin.*—The chloride hydrolyzes. This could be prevented by adding hydrochloric acid but then some hydrogen would be produced at the cathode and mix with the chlorine.

*Nickel and Cobalt.*—Both recommended. Cobalt can be substituted without further change for nickel in any of the reactions and processes described herein. However, nickel is to be preferred because it is lower priced than cobalt and in all technical respects is at satisfactory.

*Cadmium.*—Will work but requires a higher voltage than nickel since it lies above nickel in the electromotive force series and has a much lower electrical conductivity.

*Chromium.*—The current efficiency of deposition is low. The voltage required is higher than for cobalt or nickel. Since hydrogen is released a diaphragm is required.

*Zinc.*—Could be made to work but at greater cost than nickel without significant compensating advantage. The voltage required is higher. There is some tendency for hydrogen to form during the electrolysis of the chloride and zinc often deposits in "trees." The only advantages of zinc over nickel are its lower price and the fact that it dissolves more easily in hydrochloric acid.

Nickel and cobalt, then, are presently considered to be best suited for the process. However, it is recognized that variations of the process disclosed herein are possible. Such variations as are within the scope of the following claims are considered to be a part of the present invention.

I claim:

1. A cyclic process for converting hydrochloric acid to chlorine comprising the steps of continuously feeding a solution containing between 10 and 45 percent by weight of a metal chloride to an electrolytic cell having an anode and a cathode, the metal component of said metal chloride being selected from the group consisting of nickel and cobalt, said solution having a pH between 1.2 and 6.0 and a temperature between 40° C. and its boiling point, electrolyzing said solution to deposit said metal on said cathode, withdrawing chlorine evolved at said anode, supplying a non-acid electrolyte to a second cell having an anode of said metal and a cathode, electrolyzing said non-acid solution to dissolve said metal from said anode and precipitate the hydroxide of said metal from said non-acid solution, separating said precipitate from said non-acid solution, feeding said precipitate to a mixing tank together with the electrolyzed chloride solution from said first cell and hydrochloric acid to convert said precipitate into said metal chloride, withdrawing said metal chloride solution from said mixing tank and feeding it to said first cell and, after a suitable period of time, interchanging the roles of the first cell and second cell so that the former first cell is supplied with said non-acid solution and the former second cell is fed said metal chloride solution, and at the same time reversing the electrical polarity of the electrodes in both cells.

2. A cyclic process for converting hydrochloric acid to chlorine comprising the steps of feednig a solution containing between 10 and 45 percent by weight of a metal chloride whose metal component is selected from the group consisting of nickel and cobalt to an electrolytic cell, said solution having a pH between 1.2 and 6.0 and a temperature between 40° C. and its boiling point, electrolyzing said solution to deposit said metal component on the cathode thereof, withdrawing the chlorine evolved at the anode thereof, supplying a second metal chloride solution whose metal component is selected from the group consisting of nickel, sodium, potassium and calcium to a second electrolytic cell having the metal component of said first solution on the anode thereof, electrolyzing said second chloride solution to dissolve said metal from said anode and precipitate the hydroxide of said metal therefrom, separating said precipitate from said second solution, recovering and returning said second solution to said second cell, feeding said precipitate to a mixing tank together with the electrolyzed chloride solution from said first cell and hydrochloric acid to convert said precipitate into said first metal chloride, withdrawing and reforming said first metal chloride solution from said mixing tank and returning it to said first cell, and employing the metal deposited at the cathode of said first cell as the anode of said second cell after a suitable interval of time.

3. A cyclic process for converting hydrochloric acid to chlorine comprising the steps of electrolyzing a solution having a pH above 1.5, a temperature above 40° C. and containing above 10 percent by weight of a metal chloride, the metal component of said metal chloride being selected from the group consisting of nickel and cobalt, said solution being supplied to a first cell having an anode and a cathode to deposit the metal of said metal chloride on said cathode and evolve the chlorine of said metal chloride at said anode, employing a second cell having a non-energized anode and cathode, said second cell cathode being covered with said metal, supplying a solution of hydrochloric acid and said metal chloride at high temperature to said second cell to dissolve said metal from the cathode thereof, said dissolved metal reacting with said hydrochloric acid to form said metal chloride, and, after a suitable interval of time, interchanging the roles of the first cell and the second cell so that the anode and cathode of the first cell are non-energized and the first cell is supplied with said solution of hydrochloric acid and metal chloride to dissolve said metal previously deposited on the first cell cathode and employing the former second cell with the anode and cathode thereof energized to electrolyze said metal chloride solution.

4. A cyclic process for converting hydrochloric acid to chlorine comprising the steps of electrolytically decomposing a first solution of a metal chloride whose metal component is selected from the group consisting of nickel and cobalt to deposit the metal component thereof and evolve the chlorine component thereof; forming a second solution by adding hydrochloric acid to the depleted metal chloride first solution and dissolving said deposited metal component in said second solution; substantially removing the unreacted hydrochloric acid from said second solution and employing the resulting substantially acid-free metal chloride solution as at least a portion of said first solution.

5. The process of claim 4 wherein the step of substantially removing the unreacted hydrochloric acid in said second solution is accomplished by the step of cooling said second solution to precipitate at least some of said metal chloride therefrom, and dissolving such precipitated metal chloride.

6. A process according to claim 4 wherein said first solution is maintained at a concentration not less than 10% by weight of said metal chloride, at a pH not less than 1.5 and at a temperature not less than 40° C.

7. A process according to claim 4 wherein said second solution is at least initially heated to a temperature in excess of 200° F. and contains an amount of said metal chloride substantially equal to the weight of hydrochloric acid.

8. A cyclic process for converting hydrochloric acid to chlorine comprising the steps of electrolytically decomposing a first aqueous solution of a metal chloride whose metal component is selected from the group consisting of nickel and cobalt to deposit the metal component thereof and evolve the chlorine component thereof; adding hydrochloric acid to the depleted metal chloride first solution together with such additional metal chloride as is required to produce a second solution in which the amount of said metal chloride is substantially equal to the weight of hydrochloric acid therein; heating said second solution to a temperature in excess of 200° F.; employing said heated second solution to dissolve the said deposited metal component; withdrawing said second solution and substantially removing any unreacted hydrochloric acid therefrom; and employing the resulting substantially acid-free metal chloride solution as at least a portion of said first solution.

9. A process according to claim 3 further characterized by the additional step of withdrawing said solution of hydrochloric acid and metal chloride from said second cell, and reducing the concentration of unreacted hydrochloric acid therein to a level sufficiently low to permit the resulting solution to be fed to said first cell.

10. A process according to claim 9 wherein said step of reducing the concentration of unreacted hydrochloric acid is accomplished by the step of cooling said solution to precipitate at least some of said metal chloride therefrom, dissolving said precipitated metal chloride to form said resulting solution.

11. A cyclic process for converting hydrochloric acid to chlorine comprising the steps of electrolyzing a solution of a metal chloride whose metal component is selected from the group consisting of nickel and cobalt to produce said metal component and chlorine, said solution being maintained at a concentration not less than ten percent by weight of said metal chloride, at a pH not less than 1.5 and at a temperature not less than 40° C., dissolving the metal component thereby produced in a solution of said metal chloride and hydrochloric acid in which the amount of said metal chloride is substantially equal to the weight of hydrochloric acid at least initially and is heated to a temperature in excess of 200° F.

References Cited in the file of this patent

UNITED STATES PATENTS

| | | |
|---|---|---|
| 697,831 | Frasch | Apr. 15, 1902 |
| 1,150,370 | Jenkins | Aug. 17, 1915 |
| 1,246,099 | Hulin | Nov. 13, 1917 |
| 2,468,766 | Low | May 3, 1949 |
| 2,667,454 | Roller | Jan. 26, 1954 |
| 2,799,643 | Raetzsch | July 16, 1957 |

OTHER REFERENCES

Journal of the Electrochemical Society, May 1956, pp. 296–300.

Vivian: "A Chemical Engineering Study of Sudbury Ore Processes," pages 37 and 54.

Mellor: Comprehensive Treatise on Inorganic and Theoretical Chemistry, volume 14, pp. 509 and 591; vol. 15, pp. 147 and 385–6, 1936.